United States Patent
Ganshorn

[11] 3,709,600
[45] Jan. 9, 1973

[54] DEVICE FOR GAS ANALYSIS WITH A ROTATABLE CYLINDRICALLY SHAPED CHOPPER

[75] Inventor: Peter Ganshorn, Wuerzburg, Germany

[73] Assignee: Erich Jaeger, Wurzburg, Germany

[22] Filed: April 19, 1971

[21] Appl. No.: 134,103

[30] Foreign Application Priority Data

April 17, 1970 Germany.....................P 20 18 539.1

[52] U.S. Cl...............356/51, 250/43.5 R, 250/233, 350/275
[51] Int. Cl....G01n 21/34, G01n 21/24, G02b 17/00
[58] Field of Search......356/51, 88, 93, 95, 180, 205; 350/275; 250/218, 43.5 R, 233

[56] References Cited

UNITED STATES PATENTS

| | | | |
|---|---|---|---|
| 3,574,445 | 4/1971 | Harmon | 350/275 |
| 2,754,424 | 7/1956 | Woodhull et al. | 250/218 |
| 3,504,978 | 4/1970 | Shibata et al. | 356/95 |
| 3,120,608 | 2/1964 | Bird | 356/93 |
| 3,488,122 | 1/1970 | Roussopoulos | 356/93 |

*Primary Examiner*—Ronald L. Wibert
*Assistant Examiner*—V. P. McGraw
*Attorney*—Robert D. Flynn et al.

[57] ABSTRACT

A device for gas analysis by measurement of absorption of electromagnetic, especially optic, radiation comprises a radiation source emitting a beam of electromagnetic radiation which is splitted by a beam splitter into a sensing beam and a reference beam passing through a sensing chamber and a reference chamber, respectively to radiation sensitive means responding to the difference in intensity of the sensing and reference rays and providing a corresponding electric output signal. A rotary shutter is arranged between the radiation source and the beam splitter to chop up the emitted beam before it enters into the beam splitter. The rotary shutter or chopper comprises preferably strip-shaped elements which form parts of a cylinder, the elements having edges parallel to the axis of the cylinder and rotating around the axis of the cylinder in a circular path which includes or encompasses the radiation source.

4 Claims, 6 Drawing Figures

PATENTED JAN 9 1973 3,709,600

DEVICE FOR GAS ANALYSIS WITH A ROTATABLE CYLINDRICALLY SHAPED CHOPPER

The present invention relates to devices for gas analysis by the measurement of absorption of optic radiation, more particularly infrared radiation in which the radiation originating from a single source is divided up by a beam splitter into a sensing ray which passes through a specimen vessel and a reference ray and is periodically interrupted by a rotating shutter before it impinges on a radiation sensor arrangement which provides an output signal corresponding to the difference between the intensities of the sensing and the reference rays. In the case of gas analysis devices of the above-mentioned type the rotating shutter generally consists of a slotted plane disc whose axis of rotation lies between the optic axes of the sensing and reference ray paths, so that these two ray paths are interrupted upon the rotation of the shutter by segments of the disc which lie diametrically opposite with reference to the axis of rotation. In the case of such an arrangement it is difficult to achieve a precisely simultaneous and even interruption of the two ray paths and maintain such an interruption in operation. On the other hand, for the accuracy of measurement it is of decisive importance that the modulation, brought about by the periodic interruption, of the sensing and reference rays is precisely equal, since otherwise, more particularly in the case of synchronous or product modulation the output signal delivered by the radiation sensing device will contain measurement errors.

Accordingly one object of the invention is to avoid these disadvantages and provide a gas analysis device in which a precisely simultaneous and even interruption of the reference and sensing ray can be set and in operation can be maintained without subsequent adjustment for long periods of time, while a good modulation characteristic together with a high efficiency are maintained.

In accordance with the invention a gas analysis device of the above-mentioned type has the feature that the rotary shutter is arranged between the source of radiation and the beam splitter.

Preferably the rotating shutter comprises strip-like elements, which have the form of a cylindrical envelope delimited by edges parallel to the axis. The source of radiation is in this case arranged inside the space enclosed by the rotating shutter.

In connection with such a shutter it is particularly advantageous if the cross-section of a beam passing from the radiation source to the beam splitter is elongated in the direction of the axis of rotation, coinciding with the cylinder axis, of the shutter or chopper.

Further developments and forms of the invention are set forth in the subclaims.

The invention will now be described in more detail with reference to an embodiment shown in the accompanying drawing.

Figure 5:
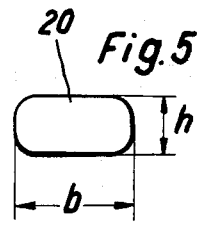
FIG. 5 shows the radiation outlet opening of the radiation source unit.
Figure 2:
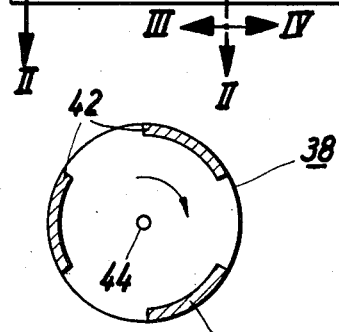
FIG. 2 represents a section on the plane II—II of FIG. 1.
Figure 3:
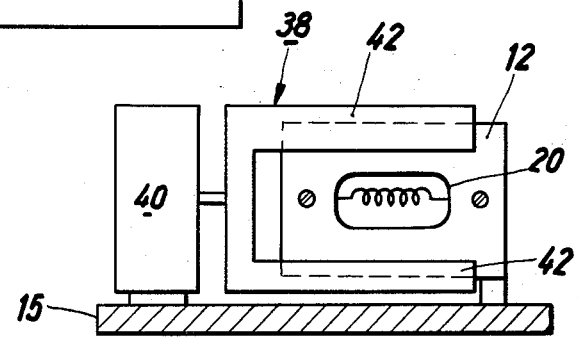
FIG. 3 is a sectional view looking in the direction of the arrows III—III of FIG. 1.

The gas analysis device shown as an embodiment of the invention comprises a radiation source unit 10 with a massive metal block 12 which on one side is attached to a base plate 15. The block 12 comprises an elongated recess 14 in which a radiation source 16 in the form of a tungsten filament coil is arranged whose ends pass out through insulating bushes and are connected with a stabilized current source, not shown. The opening of the recess 14 is closed by a window 18, which allows the passage of the radiation, for example in the form of a mica plate. The recess 14 has an elongated radiation exit opening 20 (see also FIGS. 3 and 5) which is opposite a correspondingly shaped radiation inlet opening 22 of a beam splitter 24, which is in substance formed by a metal block 26, in which two diverging holes 28 and 30 originating at the inlet opening 22 are bored. The inner walls of these channels 28 and 30 are finished to have the best possible reflecting properties and are therefore for this purpose highly polished. The radiation passing from the radiation source and entering through the opening 22 is divided between the two channels 28 and 30 so that a sensing ray (for example in channel 28) and a reference ray (for example in channel 30) result. The two rays pass through vessels 32 and 34, of which one contains the gas to be analyzed, and impinges on a radiation sensor 36, not shown in detail, which provides a signal corresponding to the difference in intensities between the sensing and reference rays. The radiation sensor 36 can for example comprise gas filled chambers separated by a membrane and the incident radiation is absorbed in chambers 32, 34. When there is a difference in intensities between the sensing and reference rays, there is a corresponding displacement of the membrane which, as is the case with a condensor microphone, is converted into an electric signal.

In order to be able to process the output signal from the radiation sensor 36 with AC amplifiers, with which as is known a higher stability can be achieved than is the case with DC amplifiers, the radiation is periodically interrupted on its path from the radiation source 16 and the radiation sensor 36. This interruption is brought about by means of a rotating slotted shutter 38 which in the case of the present gas analysis device interrupts the radiation between the radiation source 16 and the inlet opening 22 of the beam splitter 24. The rotating slotted shutter 38 is driven by a synchronous motor 40 and comprises strip-like elements 42 which have the form of parts of a cylindrical envelope, whose edges run parallel to the axis of the cylinder, which coincide with the axis 44. In the case of the embodiment shown three elements 42 are present which have an angular extent of 60°. The number of the elements is so selected in accordance with the speed or rotation of the synchronous motor that the desired frequency of interruption is achieved. This frequency may depend inter alia on the gas whose presence is to be shown.

Figure 6:
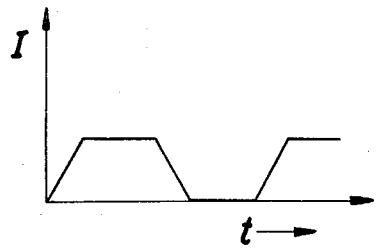
FIG. 6 is a graph of intensity I of radiation passing from the radiation source unit to the beam splitter against time (or the angle of rotation of the shutter).

The cylindrical construction of the shutter 38 offers the advantage that the edges of the shutter elements 42 run through the cross-section of the radiation and all points parallel to the axis of rotation quite evenly so that there is a precise symmetry of modulation of the sensing ray and of the reference ray. The elongated form of the ray cross-section (see for example FIG. 5) makes possible a very favorable course of modulation for a given size of the ray cross-section, that is to say the modulated radiation is approximately rectangular (FIG. 6) while in the case of prior art segment discs only an approximately rectangular modulation could be achieved. Lack of symmetry of the radiation source and changes in the characteristic of the radiation source during the course of operation are practically without any effect so that it is possible to dispense with the adjustability of the shutter as regards the ray path as provided in prior art devices.

Figure 1:
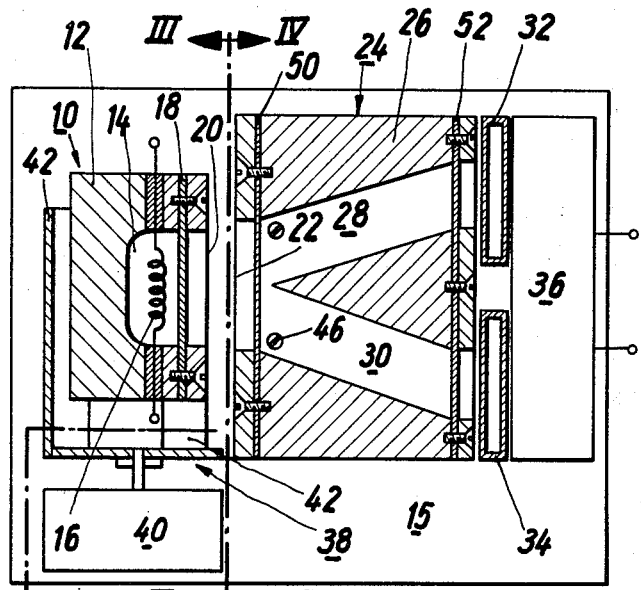
FIG. 1 shows partially in section a gas analysis device in accordance with an embodiment of the invention, as seen from above.
Figure 4:
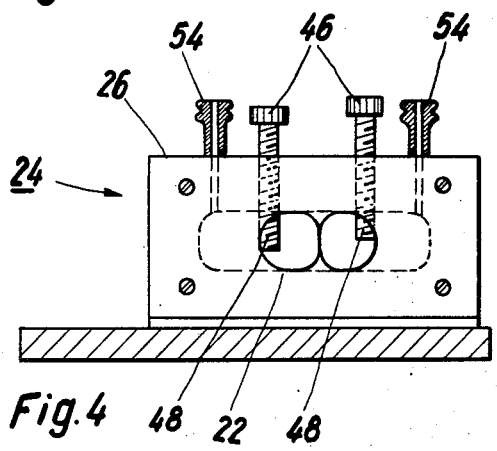
FIG. 4 is a sectional view looking in the direction of the arrows IV—IV of FIG. 1.

In order to make the radiation intensities of the sensing and the reference rays symmetrical, adjusting screws 46 are provided which have blackened front ends 48 and for adjustment can be made to extend to a greater or a lesser extent into the channels 28 and 30 of the sensing and reference rays, see FIGS. 1 and 4.

Preferably the channels 28 and 30 are closed at their ends by windows 50 and 52 transparent to the radiation so that they form a vessel which can be filled via connections 54 (FIG. 4) with a so-called dummy gas, that is to say a gas which is not to be measured. This reduces in a conventional manner the so-called "transverse sensitivity". By the use of the beam splitter as a vessel for the dummy gas the device can be made particularly compact.

I claim:

1. Device for gas analysis by measurement of absorption of radiation comprising a radiation source (16) elongated in a given direction;

an elongated casing member (12) forming a chamber (14) in which said radiation source (16) is positioned, said chamber having a radiation exit opening (20) elongated in said given direction;

a beam splitter (24) having an elongated entrance opening (22) facing, and opposed to said exit opening (20) and two tube-like channels (28, 30) having highly polished inner surfaces beginning at said elongated entrance opening (22) and ending in two channel exit openings;

specimen and reference vessels (32, 34) one each positioned in front of one of said channel exit openings;

radiation sensing means (36) responding to the difference in intensity of sensing and reference beams emerging from said channel exit openings and travelling through respective vessels (32, 34) to said radiation sensing means (36);

and a rotary shutter (38) comprising strip-like elements (42) extending essentially parallel to said given direction and cylindrically surrounding the radiation source to alternately block and permit passage of radiation from the source (16) to the elongated entrance opening (22), the rotary shutter strips forming parts of a cylindrical envelope and having edges parallel to the axis of the cylindrical envelope and extending in said given direction, said rotary shutter being mounted to rotate around an axis essentially parallel to said given direction and along a path coaxial with said casing member to provide a shutter path going through the space between said exit and entrance openings.

2. Device according to claim 1 wherein adjusting screws (46), which can be screwed into the channels (28, 30) are provided to adjust the relative relationship of the split beams passing through said channels.

3. Device in accordance with claim 2 in which the ends of the adjusting screws (46) are blackened.

4. Device in accordance with claim 1 comprising windows (50, 52) transparent to radiation in the channels and closing the entrance opening (22) and the channel exit openings of the beam splitter (24);

and means (54) for filling the channels with a dummy gas.

* * * * *